(12) United States Patent
Lim et al.

(10) Patent No.: US 6,606,126 B1
(45) Date of Patent: Aug. 12, 2003

(54) DEINTERLACING METHOD FOR VIDEO SIGNALS BASED ON MOTION-COMPENSATED INTERPOLATION

(75) Inventors: Il Taek Lim, Seoul (KR); Kyoung Won Lim, Seoul (KR); Cheol Hong Min, Seoul (KR)

(73) Assignee: LG Electronics, Inc., Seoul (KR)

( * ) Notice: Subject to any disclaimer, the term of this patent is extended or adjusted under 35 U.S.C. 154(b) by 278 days.

(21) Appl. No.: 09/654,168

(22) Filed: Sep. 1, 2000

(30) Foreign Application Priority Data

Sep. 3, 1999 (KR) ......................................... 1999-37264

(51) Int. Cl.[7] .............................................. H04N 7/01
(52) U.S. Cl. ...................................... 348/452; 348/448
(58) Field of Search ................................. 348/452, 448, 348/700, 459, 701; 382/299, 300

(56) References Cited

U.S. PATENT DOCUMENTS 5,619,272 A * 4/1997 Salmon et al. ............... 348/452
5,682,205 A * 10/1997 Sezan et al. ................. 348/452
5,784,114 A * 7/1998 Borer et al. ................. 348/452

* cited by examiner

*Primary Examiner*—Victor R. Kostak
(74) *Attorney, Agent, or Firm*—Fleshner & Kim, LLP (57) ABSTRACT

Disclosed is a motion-compensated interpolation (MCI)-based deinterlacing method for converting video signals of an interlaced scanning format into those of a progressive scanning format. The deinterlacing method involves a motion vector estimation step, a video signal deinterlacing step, a deinterlacing side-effect check step, and a deinterlaced result select step. The motion vector estimation step includes the steps of estimating a motion vector by the unit of a ½ pixel, using the previous frame, the current field, and the future field, and estimating a motion vector by the unit of a ¼ pixel, using the previous frame and the future field. Based oh a motion vector estimated at the motion vector estimation step, the video signal is deinterlaced. The deinterlacing side-effect check is achieved by conducting a check for determining whether or not the estimated motion vector has a temporal consistency, a check for determining whether or not the estimated motion vector has a critical velocity, and a check for determining whether or not the estimated motion vector has a backward matching accuracy. When the result of the side-effect check is satisfactory, the result of the deinterlacing is accepted. On the other hand, when the result of the side-effect check is unsatisfactory, the result of a deinterlacing conducted based on a method other than the MIC is accepted.

26 Claims, 6 Drawing Sheets

Previous frame    Current frame

FIG. 5a

Previous deinterlaced frame    Current field    Future field

DEINTERLACING METHOD FOR VIDEO SIGNALS BASED ON MOTION-COMPENSATED INTERPOLATION

BACKGROUND OF THE INVENTION

1. Field of the Invention

The present invention relates to a deinterlacing method based on a motion-compensated interpolation (MCI).

In particular, the present invention relates to a method for converting video signals of an interlaced scanning format into those of a progressive scanning format, that is, a deinterlacing method for video signals.

More particularly, the present invention relates to a deinterlacing method for video signals in which an MCI is taken into consideration in a conversion of video signals of an interlaced scanning format into those of a progressive scanning format.

Furthermore, the present invention relates to a deinterlacing method for video signals in which involves estimating a motion vector for a current block by the unit of a ½ pixel and the unit of a ¼ pixel, deinterlacing the current block, based on the estimated motion vector, conducting a side-effect check for the MCI-based deinterlacing, and outputting the result of the MCI-based deinterlacing or outputting the result of a deinterlacing conducted based on a method other then the MCI, in accordance with the result of the side-effect check.

2. Description of the Prior Art

In present television systems, a specific scan format so called an "interlaced scan format" is adopted. In accordance with an interlaced scanning format for NTSC television systems, odd and even lines of 525 scan lines are outputted to a display in an alternating fashion at intervals of a ¹⁄₆₀ second for every picture. On the other hand, odd and even lines of 625 scan lines are outputted to a display in an alternating fashion at intervals of a ¹⁄₆₀ second for every picture in accordance with an interlaced scan format for PAL systems.

Here, respective pictures outputted at intervals of a ¹⁄₆₀ second are referred to as "fields". A complete picture consisting of two fields is referred to as a "frame".

A field consisting of odd scan lines is referred to as an "odd field" or a "top field" whereas a field consisting of even scan lines is referred to as an "even field" or a "bottom field".

The interlaced scan format, in which every frame is outputted to a display in a state divided into two fields, provides an advantage in that it can reduce the bandwidth of TV signals by ½, as compared to a non-interlaced progressive scan format in which all scan lines of every frame are outputted in a ¹⁄₆₀ second.

If TVs of the present NTSC television system, which uses a bandwidth of 6 MHz by virtue of the above mentioned interlaced scan format adopted thereby, did not adopt the interlaced scan format, they would require a bandwidth of about 12 MHz.

In spite of an advantage in that the bandwidth required for signal processing can be reduced, the interlaced scan format involves a drawback in that when a video having horizontal fine line patterns is displayed on a display, those fine line patterns may be chattered at a frame frequency of 30 Hz. That is, a large-area flickering phenomenon may occur.

Where the video displayed on the display contains an object flickering at 30 Hz, there is a problem in that fine line patterns may be viewed in an overlapped state over the object.

The above mentioned phenomena, which result in a degradation in picture quality, are inevitably involved in the interlaced scan format.

However, the advent of digital TV systems has caused picture quality to be considered as a very important factor.

Advanced Television Systems Committee (ATSC) standard for digital TV signals adopts both the progressive scan format and the interlaced scan format.

For instance, TV standard for a size of 704 pels*480 lines adopts a 60 Hz progressive scan format and a 60 Hz interlaced scan format.

In the case of a digital TV receiver adopting a progressive scan format, video signals of such an interlaced scan format should be converted into those of a progressive scan format.

On the other hand, where TV signals are to be displayed on the monitor of a PC via a TV receiver card mounted to the PC, it is necessary to convert TV signals of an interlaced scan format into those of a progressive scan format because the monitor can display only videos of the progressive scan format.

Thus, the conversion of video signals from the interlaced scan format into the progressive scan format is essentially required in various cases.

Mainly, there are two methods for the conversion of video signals from the interlaced scan format into the progressive scan format.

The first method is an inter-field interpolation, and the second method is an intra-field interpolation.

A simple example of the inter-field interpolation is a weave method in which one frame is formed by combining one top field and one bottom field.

In accordance with this method, however, horizontal lines disturbing to the eye are formed at a moving portion of the displayed video even though a good display result is obtained in associated with the still portion of the video. This is because there is a timing difference between the two fields.

A more complex example of the inter-field interpolation is a motion-compensated interpolation.

In accordance with the motion-compensated interpolation, motion information is extracted from a frame in order to conduct a desired line interpolation. Based on the extracted motion information, empty lines of the current field are interpolated by the previous field or the further previous field.

In this case, it is important to allow the motion compensation to be accurately carried out.

Meanwhile, a simple example of the intra-field interpolation is a bob method in which one frame is formed using the scanning lines of one field two times.

In accordance with this method, it is possible to prevent horizontal lines disturbing to the eye from being formed at a moving portion of the displayed video. However, there is a complexity in forming frames. Furthermore, the fine portions of the displayed video may be chattered at 30 Hz.

Furthermore, a degradation in vertical resolution is involved in this method. In particular, a distortion in a stepped shape is generated at edge portions of the displayed video.

A more complex example of the intra-field interpolation is an edge-directional interpolation (EDI).

In accordance with this EDI, only the pixels of the current field are used to interpolate the empty lines of the current field. In particular, the directions of edges are detected in order to carry out the interpolation based on the information detected.

Therefore, it is important to detect the edge directions accurately.

Generally, one of the above mentioned methods, either MCI or EDI, is selectively used for conventional deinterlacing techniques.

Most commercially available TV receiver cards allowing TV signals to be displayed on a PC monitor are configured to select a desired one of bob and weave modes using a control program.

Even in the case in which a complicated algorithm is implemented using a VLSI chip, a fundamental type of the EDI is implemented in most cases.

For the MCI, there are few examples in which a deinterlacing chip is used.

However, present VLSI techniques have reached a level capable of implementing a considerably complex MCI algorithm.

In this regard, the present invention proposes a high performance MCI algorithm which can be implemented using a VLSI chip.

SUMMARY OF THE INVENTION

Therefore, an object of the invention is to provide a deinterlacing method for video signals based on an MCI, in which an MCI algorithm can be implemented, in a deinterlacing for video signals of an interlaced scan format into a progressive scan format, by use of a VLSI chip capable of obtaining video signals of a progressive scan format, while minimizing a degradation in picture quality.

In accordance with the present invention, this object is accomplished by providing a deinterlacing method for video signals based on a motion-compensated interpolation comprising the steps of: (a) estimating a motion vector by the unit of a ½ pixel and the unit of a ¼ pixel, respectively, using a previous frame, a current field, and a future field; (b) interpolating empty pixels of the current field by pixels of the previous frame designated by the estimated motion vector, thereby deinterlacing the current field; (c) conducting a side-effect check for determining whether or not the result of the deinterlacing is satisfactory; and (d) if the result of the side-effect check is satisfactory, then outputting the result of the deinterlacing as a deinterlaced value of the current field, and if not, then outputting the result of a deinterlacing conducted in accordance with a method other than that of the step (b).

BRIEF DESCRIPTION OF THE DRAWINGS

The above objects, and other features and advantages of the present invention will become more apparent from the following detailed description when taken in conjunction with the drawings, in which.

DETAILED DESCRIPTION OF THE PREFERRED EMBODIMENTS

Figure 1:
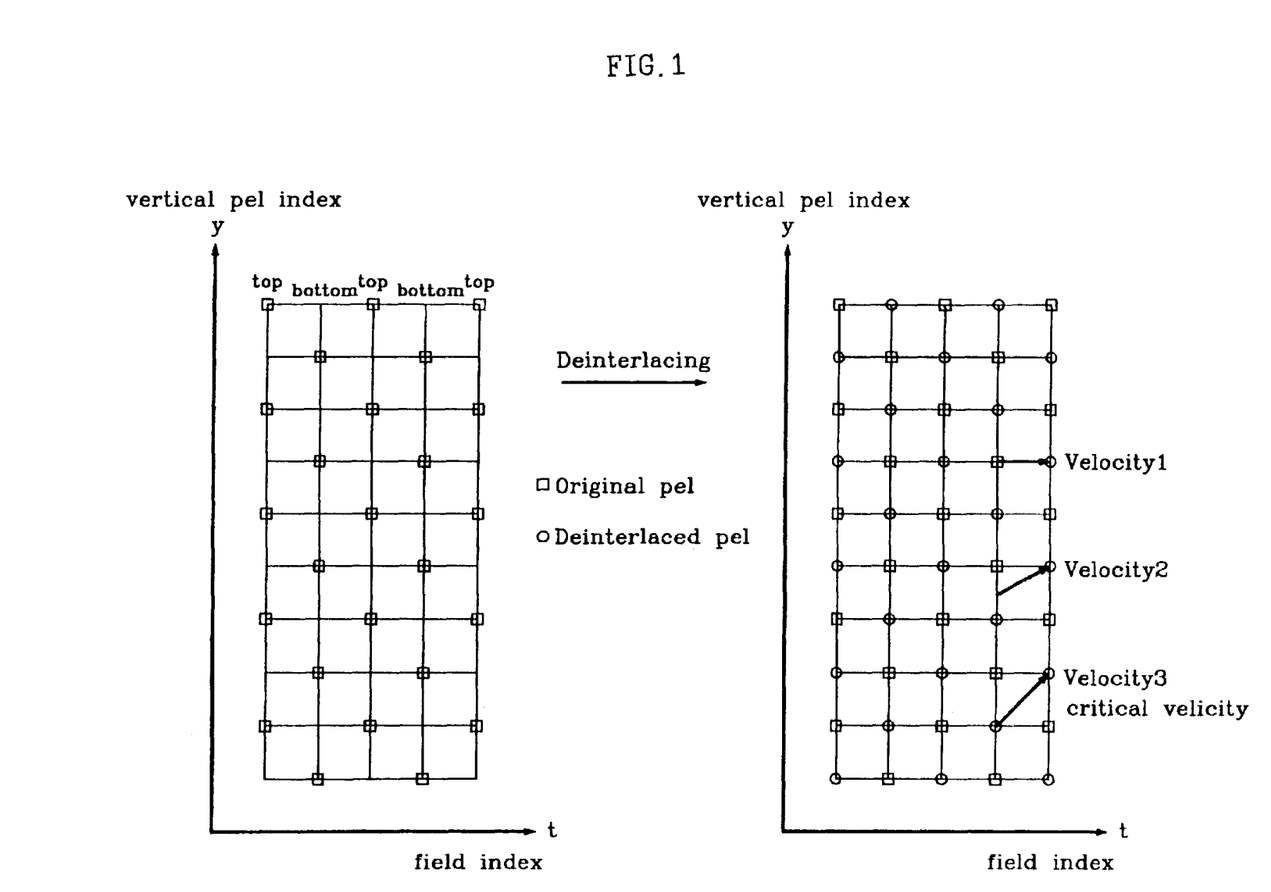
FIG. 1 is a view illustrating a deinterlacing process for video signals.

FIG. 1 is a diagram illustrating a deinterlacing method. In FIG. 1, the horizontal axis represents a field index whereas the vertical axis represents a vertical pixel index.

Square boxes at cross points on the field index-pixel index plane of FIG. 1 represent original pixels, respectively. Circles at cross points on the field index-pixel index plane represent interpolated pixels, respectively.

Where the current field deinterlaced is derived, original pixels may be brought, as they are, from the past field to the current field when they involve no motion, that is, they are still pixels. In FIG. 1, these pixels are expressed by a first velocity (Velocity1).

On the other hand, for a pixel involving a motion at a velocity less than the critical velocity, a deinterlacing may be conducted, taking into consideration both the original pixel and the interpolated pixel. In FIG. 1, such a pixel is expressed by a second velocity (Velocity2).

Meanwhile, where pixels move upwardly or downwardly by a ½ pixel for a ¹⁄₆₀ second, that is, at the critical velocity (Velocity3), between successive fields, it is possible to bring only pixels, already interpolated, from the past field to the current field.

However, where such a situation, in which interpolated pixels are brought from the past field to the current field, is repeated, an error propagation may occur because those pixels already interpolated in the past field may involve an error.

For this reason, even though a motion is detected, it is difficult to expect satisfactory results from an MCI deinterlacing based on information from the detected motion.

The present invention proposes a deinterlacing method for video signals in which involves estimating a motion vector for a current block by the unit of a ½ pixel and the unit of a ¼ pixel, respectively, deinterlacing the current block, based on the estimated motion vector, conducting a side-effect check for the MCI-based deinterlacing, and outputting the result of the MCI-based deinterlacing or outputting the result of a deinterlacing conducted based on a method other then the MCI, in accordance with the result of the side-effect check.

The present invention also proposes an MCI algorithm which can be implemented using a VLSI chip.

The deinterlacing method of the present invention comprises the steps of estimating a motion vector for a video signal, deinterlacing the video signal, based on the estimated motion vector, conducting an evaluation for the result of the deinterlacing, that is, conducting a side-effect check for the deinterlacing, and selectively outputting the result of the deinterlacing in accordance with the result of the side-effect check.

The deinterlacing method of the present invention has features in that at the motion vector estimating step, a motion vector is estimated by the unit of a half pixel, using a past frame, a current field, and future field, while being estimated by the unit of a quarter pixel, using the past frame and the future field.

The deinterlacing method of the present invention also has features in that at the deinterlacing step, the empty pixels in the current field are interpolated by pixels of the past frame designated by the motion vector, and that where a motion vector derived by a ¼ pixel unit is used, a desired pixel is formed from four pixels, arranged around the position of a pixel to be brought from the past frame, in a weighted average fashion.

Also, the deinterlacing method of the present invention has features in that at the side-effect check step, the check for MCI side effects is made by conducting a check with respect to a temporal consistency of the motion vector, a critical velocity of the motion vector, and a backward matching accuracy.

In addition, the deinterlacing method of the present invention has features in that if the result of the side-effect check is satisfactory, the result of the MCI-based deinterlacing is outputted as a deinterlaced value of the current field, and if not, the result of a deinterlacing conducted in accordance with a method other than the MCI is outputted as a deinterlaced value of the current field.

Figure 2:
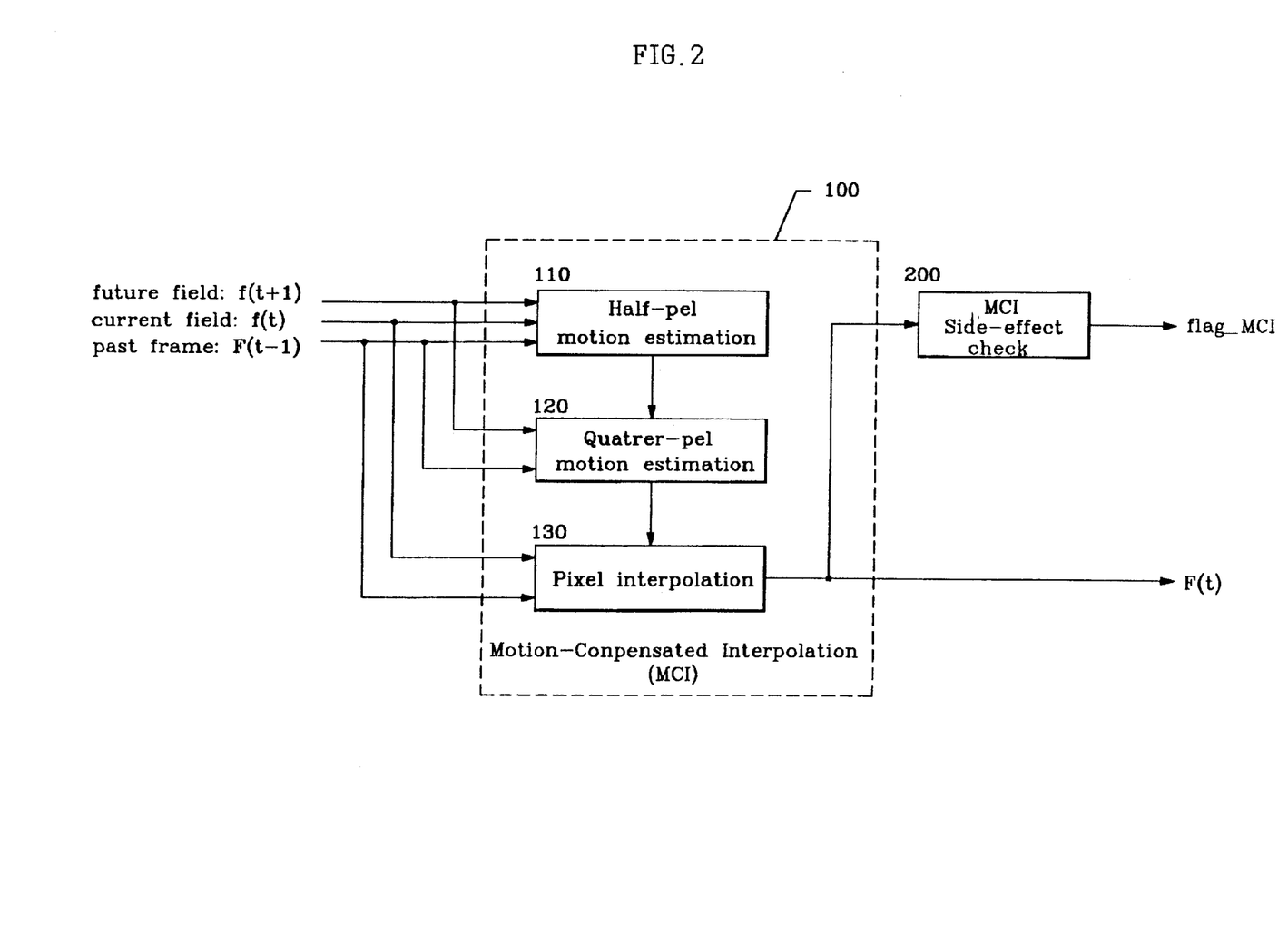
FIG. 2 is a block diagram illustrating a deinterlacing apparatus adapted to carry out a deinterlacing method according to an embodiment of the present invention.

FIG. 2 is a view illustrating a deinterlacing method according to the present invention.

Referring to FIG. 2, input data adapted to estimate a motion vector includes three data, that is, a past frame F(t−1), a current field f(t), to be currently interpolated, and a future field f(t+1).

The past frame F(t−1) is stored with deinterlaced results.

The fact that the future field f(t+1) is used in the algorithm of the present invention means that the algorithm involves a latency delay corresponding to one field.

An MCI section 100 estimates a motion vector, based on the past frame F(t−1), the current field f(t), and the future field f(t+1), brings, from the past frame F(t−1), pixels respectively located at positions designated by the estimated motion vector to interpolate the current field f(t), and outputs the resultant deinterlaced frame F(t).

The MCI section 100 includes a first motion estimation unit 110 adapted to conduct a motion vector estimation by the unit of a half pixel, a second motion estimation unit 120 adapted to conduct a motion vector estimation by the unit of a quarter pixel, and an interpolation unit 130 adapted to conduct a pixel interpolation for the past frame F(t−1) and the current field f(t)

A side-effect check section 200 checks whether or not the interpolated frame F(t) is correctly deinterlaced. The side-effect check section 200 outputs a flag flag_MCI, indicative of the result of the checking, for every block.

The flag flag_MCI is a flag for determining whether or not the MCI-based deinterlacing has been correctly conducted. When the flag_flag MCI corresponds to a value of 1 (flag_MCI=1), interlaced blocks of the current frame F(t) are applied. On the other hand, when the flag flag_MCI corresponds to a value of 0 (flag_MCI=0), the result of a deinterlacing conducted based on a method other than the MCI is used, in place of the interlaced blocks of the current frame F(t).

In order to implement the MCI, an estimation of motion vectors should be carried out.

Figure 3:
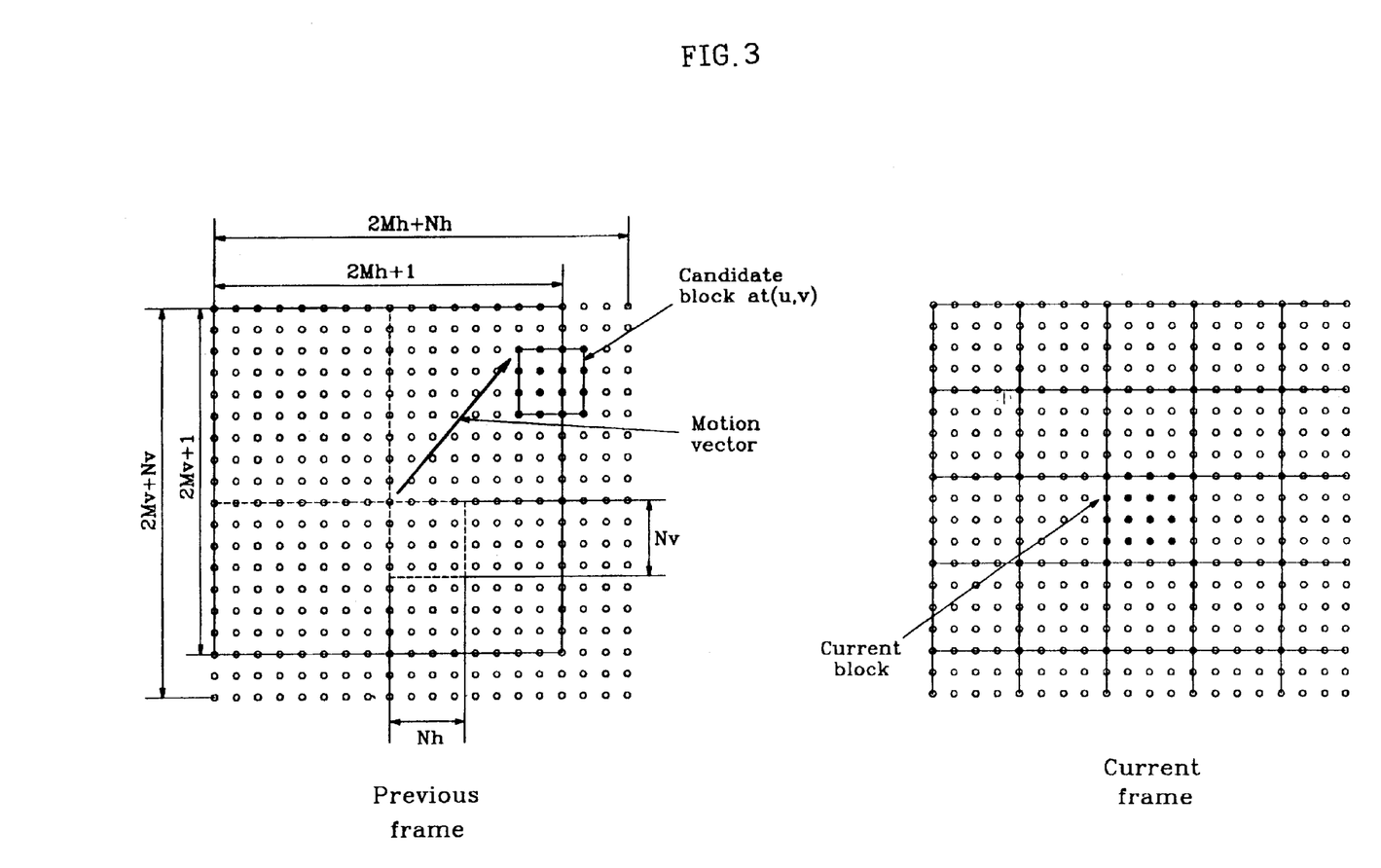
FIG. 3 is a view illustrating a general motion estimation procedure.

FIG. 3 is a view illustrating a general motion vector estimation method.

In accordance with the illustrated general motion vector estimation method, under the condition in which current and previous frames are given, the current frame is divided into basic blocks of a certain size in order to determine which portion of the previous frame corresponds to a selected block of the current frame.

Although the size of each block (Nh×Nv) is not limited, a block size of 16×16 is used in the case of MPEG.

The search range for the portion of the previous frame corresponding to a selected block of the current fame corresponds to a range of −Mv to +Mv, as indicated by a large square block in the previous frame.

The search area of the previous frame includes all groups of pixels shown in FIG. 3. A cost function is used to determine an optimum motion vector. In most cases, such a cost function uses a mean absolute difference (MAD) between the pixel values of two blocks.

Typically, a motion vector for the above mentioned block unit is derived at an integer pixel accuracy. Sometimes, such a motion vector is derived at an accuracy of a half-pixel unit.

Figure 4:
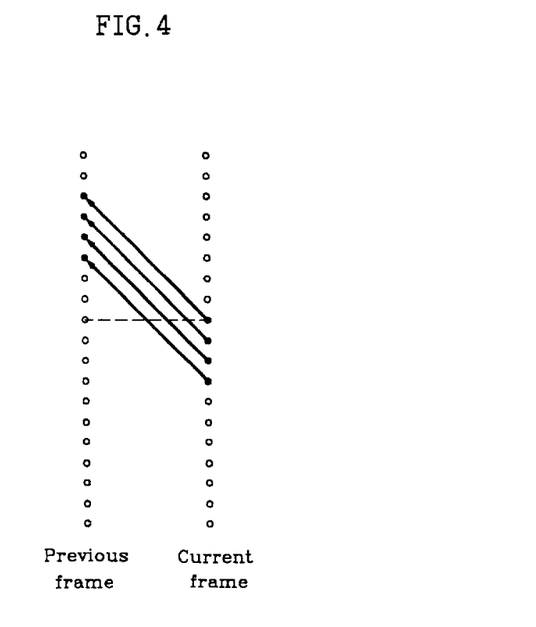
FIG. 4 is a view illustrating a block relationship between current and previous frames in the general motion estimation procedure of FIG. 3.

FIG. 4 illustrates a block relationship between current and previous frames associated with motion vectors derived at an integer pixel accuracy. In FIG. 4, only pixels of vertical lines in video signals respectively corresponding to the previous and current frames.

However, there is a problem in the case in which the above mentioned method of FIGS. 3 and 4 is applied to the calculation of motion vectors for a deinterlacing. This is because the previous frame deinterlaced is imperfect. In other words, the deinterlaced pixels may have an error considerably different from the true value. Also, the above problem is also caused by the fact that the current video data is not associated with a frame, but associated with a field. For these reasons, the general motion vector estimation method of FIG. 3 cannot be applied to the motion vector estimation for a deinterlacing.

In order to solve the above mentioned problem, various methods have been proposed. An example of a conventional method is to derive motion vectors, only using a previous field f(t−1) and a current field f(t).

However, this conventional method has a problem in that MAD values considered not to be small are generated even for input data associated with a still video because the current and previous fields are mismatched from each other.

In this case, it is difficult for the motion vector estimator used to accurately recognize a still video.

That is, although pixels corresponding to those of the current field f(t) to be interpolated have to be brought from the previous field f(t−1), they are arranged at positions corresponding to those of the pixels of the current field f(t) to be interpolated.

To this end, each pixels to be brought is derived by conducting a bilinear interpolation for pixels neighboring upwardly and downwardly to that pixel. In this case, the derived pixel has a pixel value corresponding to an average of those in the up and down pixels.

The pixel derived in accordance with such an interpolation always has a value different from that of the pixel arranged at a position corresponding to that of the counterpart field. For this reason, although a still video is inputted, the motion vector of "(0, 0)" associated with the still video is not outputted.

Another example for solving the above mentioned problem associated with a still video is to compare the previous field f(t−1) and the future field f(t+1 ) with each other.

In accordance with this method, an MAD value approximate to "0" is generated for each block of a still video because the previous and future fields f(t−1) and f(t+1) are correctly matched with each other.

Accordingly, it is possible to surely recognize the still video.

However, this method involves other problems. That is, there is a problem involved in the case in which an object flickering at 30 Hz (like as patterns on a rotating wheel) appears in the current field f(t) while disappearing in the previous and future fields f(t−1) and f(t+1).

In this case, respective MAD values derived from the previous and future fields f(t−1) and f(t+1) are approximate to "0". However, the picture of the current field f(t) is remarkably different from the previous and future fields f(t−1) and f(t+1).

For this reason, the current frame F(t) formed by a combination of the previous and current fields f(t−1) and f(t) may be viewed in the form of mixed heterogeneous lines (in the form of an image with horizontal lines ugly drawn.

In order to solve both the above mentioned problems, the present invention provides a motion vector estimation procedure involving two steps.

The first step of the motion vector estimation procedure according to the present invention is a half-pixel motion estimation for estimating a motion vector by the unit of a 0.5 pixel (a half pixel), using the previous frame F(t−1), the current field f(t), and the future field f(t+1). The second step of the motion vector estimation procedure according to the present invention is a quarter-pixel motion estimation for estimating a motion vector by the unit of a 0.25 pixel (a quarter pixel), using the previous frame F(t−1) and the future field f(t+1).

The size of a basic block used in the motion vector estimation procedure according to the present invention is 4×4 when it is applied to a frame.

In the first step of estimating a motion vector by the unit of a 0.5 pixel, however, an 8×8 block is used to derive an MAD value. The 8×8 block is defined by the basic block and certain pixels added to each edge of the basic block, based on the concept of a guard region.

That is, two pixels are added to each edge of the basic block, so that the 8×8 block is defined. However, the basic block of the search range still has a 4×4 size. Accordingly, blocks are moved while overlapping with each other by two pixels in each of the vertical and horizontal directions.

The reason why the guard region is used is that if a pixel arranged at one edge of a particular block involve a motion in a direction different from that of the motion of that block, the result of the deinterlacing conducted from the block may have a visual problem.

In other words, the deinterlacing for the block based on a motion vector can provide a satisfactory result only when a consistent motion is carried out in a region including that block and having an area slightly larger than that of the block.

If a small MAD value is derived for a block in spite of the use of the guard region, then that block is a satisfactory region involving a motion consistent even in a wider region including the block.

On the other hand, if a large MAD value is derived for a block due to the use of the guard region, a flag flag_MCI set to "0" is outputted from a subsequent side-effect check step so as to inform an external section of this fact.

In response to this information, the external section abandons a deinterlacing based on the MCI, and conducts a deinterlacing according to a method other than the MCI.

Figure 5A:
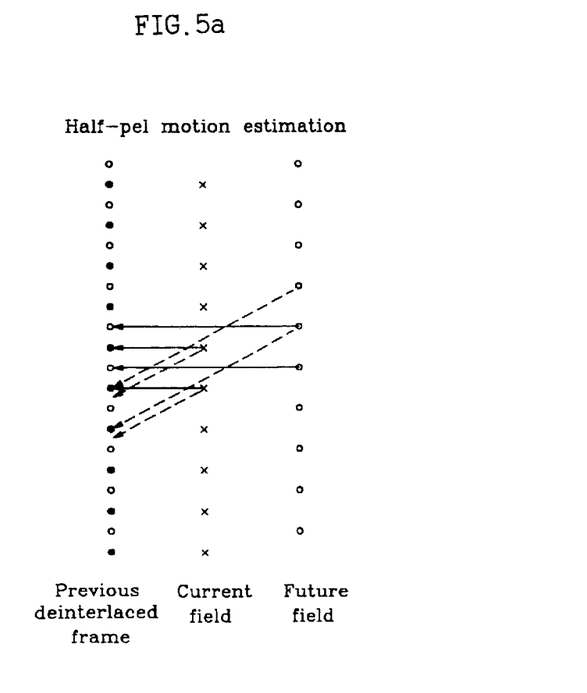
FIG. 5a is a view illustrating a first motion vector estimation procedure conducted in a first motion estimation unit included in the deinterlacing apparatus of FIG. 2.

FIG. 5a illustrates the first motion vector estimation step conducted in the first motion estimation unit 110. For the convenience of the illustration, no guard region is not illustrated in FIG. 5a.

In FIG. 5a, motion vectors associated with still pixels are indicated by solid lines, respectively, whereas motion vectors associated with pixels moving upwardly are indicated by phantom lines, respectively.

The basic block is likely to have a size of 4×2 at the current field end or the future field end. At the frame end, however, the basic block has a size of 4×4.

In order to derive a motion vector between the previous frame F(t−1) and the future field f(t+1) in this case, it is necessary to appropriately adjust the position of an associated block in the next field f(t+1) in such a fashion that the motion vector passes through an associated block in the current field f(t).

That is, when a motion vector is depicted in the form of an arrow, this arrow has to pass through an associated block region of the current field f(t).

In such a case, it is possible to enhance the accuracy of the motion vector.

Thus, it is possible to estimate a motion vector by the unit of a 0.5 pixel corresponding to an intermediate position between neighboring pixels, as shown in FIG. 5a.

The second motion estimation unit 120 estimates a final motion vector, based on the motion vector estimated by the first motion vector estimation unit 110.

Figure 5B:
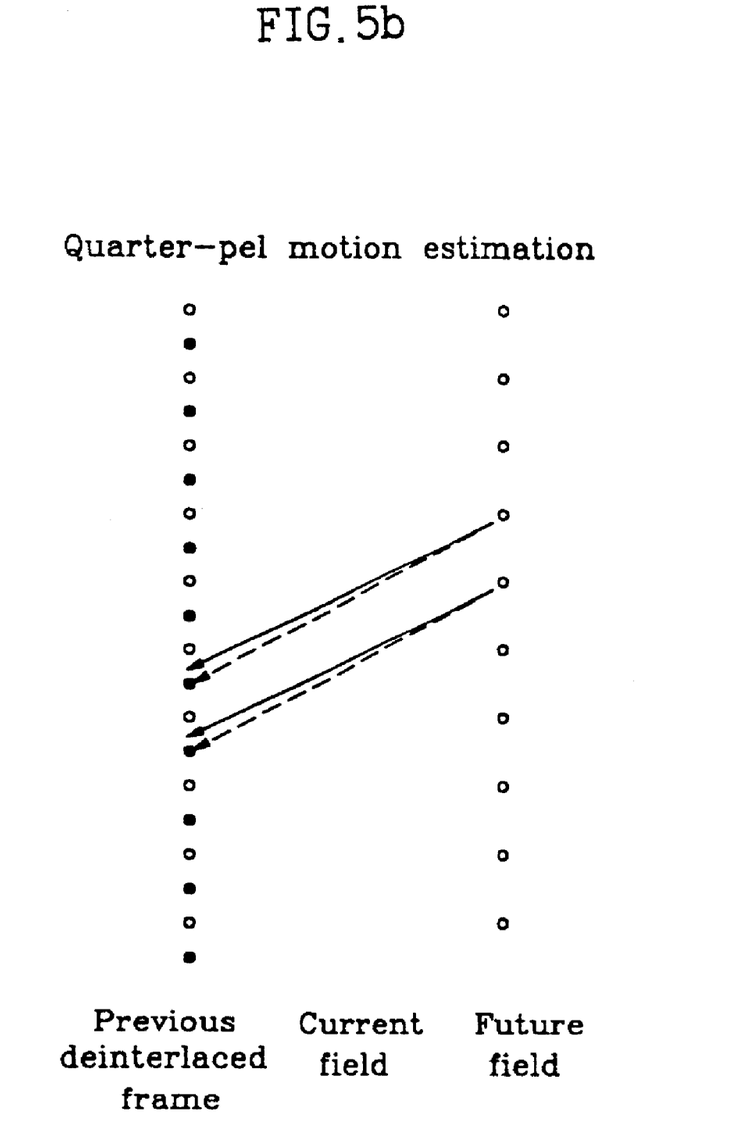
FIG. 5b is a view illustrating a second motion vector estimation procedure conducted in a second motion estimation unit included in the deinterlacing apparatus of FIG. 2.

FIG. 5b illustrates the second motion vector estimation step.

At the second motion vector estimation step, the pixels according to the guard region concept are used no longer. This is because factors possibly generating errors have been completely removed at the first motion vector estimation step.

At this second motion vector estimation step, MAD values are derived for a central vector, associated with the motion vector derived by the 0.5 pixel unit, and 8 vectors arranged around the central vector at an interval of a 0.5 pixel, respectively. The vector corresponding to a minimum one of the derived MAD values is determined to be a final motion vector.

As mentioned above, this motion vector is derived using only the previous frame F(t−1) and the future field f(t+1). Accordingly, where the picture associated with the block, for which the motion vector is derived, is a still or slowly moving picture, the motion vector correctly reflects that state of the picture.

In FIG. 5, the motion vector derived at the first motion vector estimation step is indicated by a phantom line. The solid line in FIG. 5 is indicative of the result of the detection for a motion vector made again for the derived motion vector.

Although the motion vector detection is illustrated as being carried out by the unit of a 0.5 pixel, it corresponds to the detection of a motion vector by a 0.25 pixel unit when it is considered in terms of the relation between the previous frame F(t−1) and the current field f(t). This is because the above mentioned motion vector detection is conducted between the previous frame F(t−1) and the future field f(t+1).

After the above mentioned motion vector detection procedure, a deinterlacing for the block is carried out in the interpolation unit 130.

This is achieved by bring pixels from the previous frame F(t−1) designated by the motion vector, and interpolating the empty pixels of the current field f(t) by the brought pixels.

In most cases, the motion vector detected by the unit of a 0.25 pixel is not an integer value. Accordingly, a desired pixel is formed from four pixels, arranged around a position of the pixel to be brought, in a weighted average fashion in accordance with a bilinear interpolation.

After the deinterlacing procedure, the block, which has a size of 4×2 in the current field f(t), is changed to have a size of 4×4 in the current frame F(t).

This result of the deinterlacing is then inputted to the side-effect check section 200 which, in turn, performs a side-effect check procedure for the inputted data.

As mentioned above, in the side-effect check procedure, it is checked by the basic block unit whether or not the upstream deinterlacing has been correctly conducted. The result of the check is outputted in the form of a flag flag_MCI.

When the flag flag_MCI corresponds to "1", the result of the deinterlacing is used at a subsequent step. On the other hand, when the flag flag_MCI corresponds to "0", the result of a deinterlacing conducted in accordance with a method other than the MCI is used.

The side-effect check may be carried out in accordance with diverse methods.

In accordance with the present invention, a check is made for three factors, that is, to determine whether or not the motion vector has a desired temporal consistency, to determine whether or not the motion vector has a critical velocity, and to determine whether or not the motion vector has a desired backward matching accuracy.

The first and second factors are references independent of each other. On the other hand, the third factor may be dependent on the first and second factors in terms of some purposes. However, the third factor also has independent features in that it can a remarkable independent effect in terms of the purpose of determining whether or not the deinterlacing is satisfactory.

First, a description will be made in conjunction with a temporal consistency of the motion vector.

For a desired temporal consistency of the motion vector, it is necessary for the currently derived vector not to have a considerable difference from the previously derived vector.

That is, the current and previous vectors should not have a considerable difference therebetween in terms of the horizontal vector component.

When the absolute value of a value derived by subtracting the current vector value from the previous vector value in terms of the horizontal vector component is less than a predetermined threshold value, it is determined that a desired temporal consistency of the motion vector is obtained. In this case, a flag flag_h is set to "1" (flag_h=1). On the other hand, when the absolute value is not less than the predetermined threshold value, the flag flag_h is set to "0" (flag_h=0).

Also, when the absolute value of a value derived by subtracting the current vector value from the previous vector value in terms of the vertical vector component is less than a predetermined threshold value, it is determined that a desired temporal consistency of the motion vector is obtained. In this case, a flag flag_v is set to "1" (flag_v 1). On the other hand, when the absolute value is not less than the predetermined threshold value, the flag flag_v is set to "0" (flag_v=0).

If a correct motion vector is derived, it is then required for a motion estimation error, that is, a MAD value, to be sufficiently small.

For the MAD value, there are two kinds of values, that is, the value derived at the first motion estimation step and the value derived at the second motion estimation step.

That is, there are the value derived, based on the motion vector derived by a 0.5 pixel unit using the previous frame F(t−1), the current field f(t), and the future field f(t+1) at the first motion estimation step, and the value derived, based on the motion vector derived by a 0.25 pixel unit using the previous frame F(t−1) and the future field f(t+1) at the first motion estimation step If two MAD values MAD1 and MAD2 are derived at the first and second motion estimation steps, respectively, they then have to be sufficiently small and not to be considerably different from each other.

The condition, in which both the MAD values MAD1 and MAD2 have to be sufficiently small, is essential for a desired reliability of motion vectors.

Meanwhile, the condition, in which the MAD values MAD1 and MAD2 have not to be considerably different from each other, is essential for the following reasons.

As mentioned above, the first motion estimation step is adapted to prevent an object moving at 30 Hz from being mistaken to be in a still state.

However, when such a still object is arranged in the block of the current field, the MAD value MAD1 is very lager whereas the MAD value MAD2 is relatively small.

Accordingly, although a condition capable of allowing only the MAD value MAD1 to be less than a predetermined value is made, it is possible to prevent an object moving at 30 Hz from being mistaken to be in a still state. In certain cases, however, large MAD values may be basically generated due to particular video characteristics.

In particular, large MAD values are basically generated for complex and fine pictures. In such a case, therefore, it is more reasonable to determine, based on the difference between the MAD values MAD1 and MAD2, whether or not there is an object moving at 30 Hz in the block of the current field.

In this regard, in accordance with the present invention, the absolute value of the difference between the MAD values MAD1 and MAD2 is compared with a predetermined threshold value in order to determine whether or not the motion vector has a desired temporal consistency. For the same purpose, the MAD value MAD2 itself is also compared with a predetermined threshold value.

The above comparisons can be expressed by the following Equations 1 and 2:

$$\text{abs}(MAD1-MAD2) < \text{mad\_diff\_th\_curve}(\text{activity}) \qquad [\text{Equation 1}]$$

$$MAD2 < \text{mad\_th\_curve}(\text{activity}) \qquad [\text{Equation 2}]$$

where, "abs" is a function for outputting an absolute value, "mad_diff_th_curve( )" is a function for outputting a threshold value for the absolute value of the difference between the MAD values MAD1 and MAD2, and the parameter "activity" is a quantitative value of the complexity of the block.

Although the value "activity" may be derived in accordance with diverse methods, it is necessary to experimentally determine a desired method for the derivation of the value "activity" in order to obtain a best result of the deinterlacing.

Also, "mad_th_curve( )" is a function for outputting a threshold value for the MAD value MAD 2. In similar to the above mentioned function "mad_diff_th_curve( )", the function "mad_th_curve( )" uses the value "activity" as a parameter thereof.

Respective forms of the functions "mad_diff_th_curve( )" and "mad_th_curve( )" are experimentally determined. These functions may be stored in a ROM included in a deinterlacing VLSI chip implemented in association with the present invention.

When the block satisfies Equations 1 and 2, a flag flag_d set to "1" is generated (flag_d=1). If not, a flag flag_d set to "0" is generated (flag_d=0).

Thereafter, a current temporal consistency value consistency[t] is set to "1" only when flag_h=1, flag_v=1, and flag_d=1.

At this time, the previous temporal consistency value consistency[t−1] should be in a state stored in the memory.

A flag flag_m is then set to "1" only when both the values consistency[t] and consistency[t−1] correspond to "1". If not, the flag flag_m is then set to "0".

The flag flag_m of "1" generated for a block means that the motion vector of that block is ensured to have a complete temporal consistency.

Second, a description will be made in conjunction with a determination of whether or not the motion vector has a critical velocity.

The critical velocity of the motion vector corresponds to the velocity 3 in FIG. 1. Where the derived vector is used, as it is, in this case, the deinterlaced pixel of the previous frame is used. Also, if the critical velocity is maintained for a predetermined period of time, that pixel is then further used.

In other words, a pixel used at a particular point of time has an influence on several following fields.

For this reason, if the initially deinterlaced pixel is inaccurate, this inaccuracy has an influence on several following fields.

Accordingly, where the motion vector has a critical velocity, it is then necessary to prevent an associated pixel from being brought from the previous frame, thereby preventing an error propagation.

To this end, a check should be made for the vertical component of the motion vector in order to determine whether or not the vertical component of the motion vector is within a range of ±1, ±3, ±5 or a value approximate to one of those values.

Where the motion vector is not within a predetermined critical velocity range, a flag flag_c set to "1" is generated. On the other hand, where the motion vector is within a predetermined critical velocity range, a flag flag_c set to "0" is generated.

Third, a description will be made in conjunction with a backward matching.

The concept of the backward matching is based on the fact that when the current block is projected onto the previous frame F(t−1), based on the derived motion vector, a video similar to that of the current block should be existed in a block of the previous frame F(t−1) onto which the current block is projected.

If it is determined, based on the backward matching check, that the videos of the current and previous blocks are mismatched from each other, even though the above mentioned two conditions are satisfactory (that is, "flag_m=1" and "flag_c=1"), the derived motion vector should be considered to be reliable no longer.

In this case, it is also important to determine which numerical reference is to be used for the matching of the two blocks.

This is because when there is a mismatch between those blocks even at one pixel while the blocks are substantially matched with each other, that pixel may be remarkably badly viewed in the deinterlaced video.

To this end, when an evaluation for the match between the two blocks is carried out, it is desirable to derive respective absolute values of differences between corresponding pixels of those blocks, and then to determine a largest one of the derived absolute values as a reference.

In this connection, assuming that the pixels of the current block correspond to "p1[x, y, t]", and the pixels brought from the previous frame, based on the motion vector, correspond to "p1[x, y, t]", the backward matching error E determined in this case can be expressed by the following Equation 3:

$$E = \text{Max abs}[(p1\ (x,\ y,\ t) - p2(x,\ y,\ t-1))X,\ y \in B] \qquad \text{Equation 3}$$

where, "B" represents a basic block.

In this case, the condition to be required can be expressed by the following Equation 4:

$$E < \text{backward\_match\_err\_th\_curve(activity)} \qquad [\text{Equation 4}]$$

where, "activity" is a quantitative value of the complexity of the block, as in Equations 1 and 2, and "backward_match_err_th curve( )" is a function for outputting a threshold value for the backward matching error.

When the condition of Equation 4 is satisfactory, a flag flag_b set to "1" is generated. If not, a flag flag_b set to "0" is generated.

Based on the values derived in the above mentioned three check procedures, that is, the flags flag_m, flag_c, and flag_b, a final flag flag_MCI is derived, using the following Equation 5:

$$\text{flag\_MCI} = \text{flag\_m\ \&\ flag\_c\ \&\ flag\_b} \qquad [\text{Equation 5}]$$

As apparent from Equation 5, the final flag flag_MCI is set to "1" only when all the three values have a value of "1". When the final flag flag_MCI is set to "1", the result of the deinterlacing based on the motion vector currently derived is used, as mentioned above.

Figure 6:
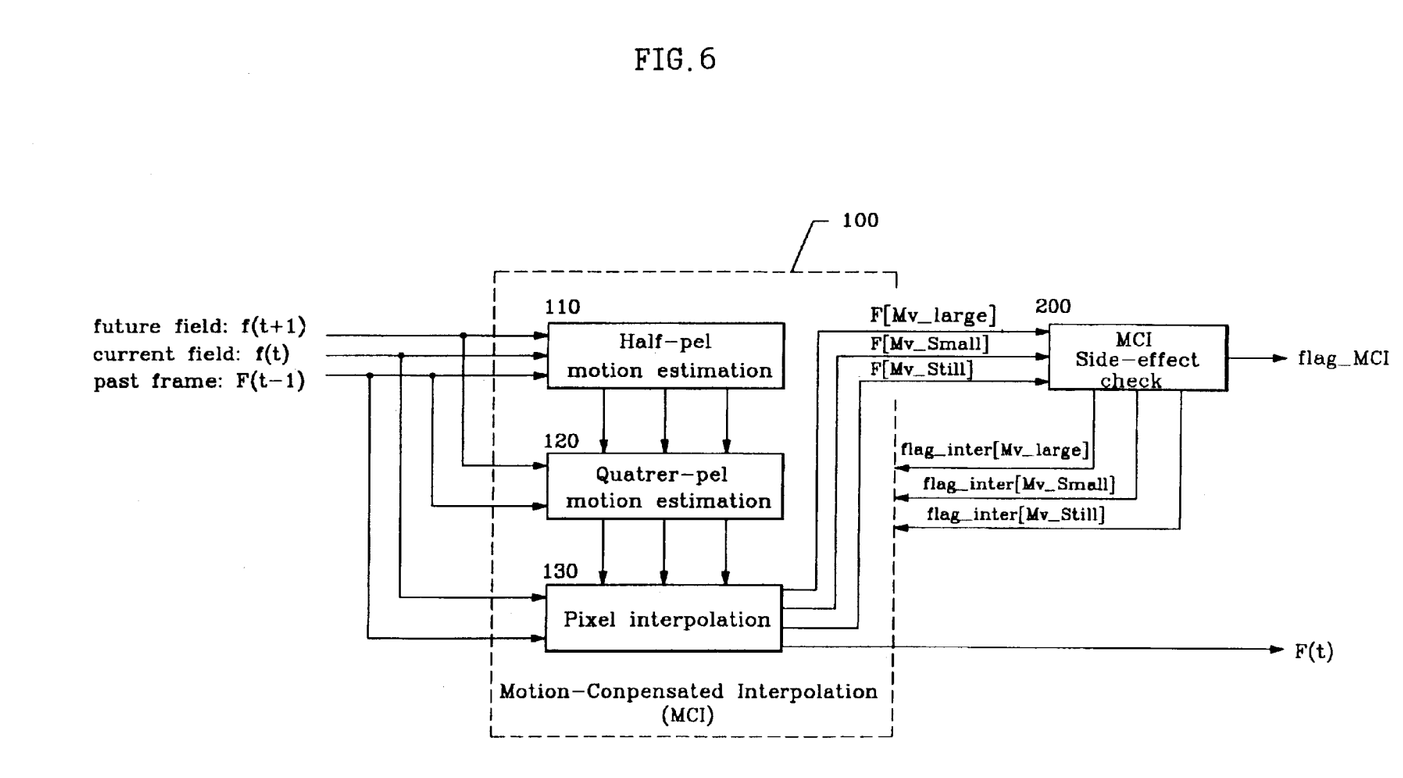
FIG. 6 is a block diagram illustrating a deinterlacing apparatus adapted to carry out a deinterlacing method according to another embodiment of the present invention.

Meanwhile, FIG. 6 illustrates another embodiment of the present invention. In accordance with this embodiment, respective motion vectors are derived while using different search ranges. The above mentioned side effect check procedure is conducted, based on respective motion vectors derived. On the basis of the results of the side effect procedure, one of the motion vectors corresponding to a narrowest search range is selected so that the result of the deinterlacing based on the selected motion vector is used.

In accordance with the embodiment illustrated in FIG. 6, at least one additional motion vector is derived for at least one search range narrower than those used for the derivation of motion vectors in the embodiment of FIG. 2.

When motion vectors are derived at the first motion vector estimation step of FIG. 5a, they are derived in pixel areas ranging from "−Mh" to "+Mh" in a horizontal direction, from "−Mv" to "+Mv" in a vertical direction, respectively. At this time, motion vectors are derived for three pairs of Mh and Mv, respectively, in accordance with the embodiment of FIG. 6.

For example, additional search ranges are used which include a large search range for "Mh=4" and "Mv=2", a small search range for "Mh=2" and "Mv=0", and a still search range for "Mh=0" and "Mv=0" in accordance with the embodiment of FIG. 6.

Since a motion vector estimation is carried out by conducting the motion estimation procedure for the above mentioned search ranges, respectively, three pairs of motion vectors are estimated for each search range.

Assuming that the derived motion vectors correspond to "mv_large", "mv_small", and "mv_still", respectively, an interpolation is carried out, based on the motion vectors mv_large, mv_small, and mv_still, respectively. The results of the deinterlacing based on the motion vectors mv_large, mv_small, and mv_still are outputted to the side-effect check section 200 which, in turn, checks respective results of the deinterlacing respectively based on the large, small and still search ranges.

Accordingly, the final MCI value flag_MCI derived in accordance with the embodiment of FIG. 2, that is, Equation 5, can be expressed by the following Equation 6:

$$\text{flag\_inter}[mv\_large] = \text{flag\_m} \ \& \ \text{flag\_c} \ \& \ \text{flag\_b} \quad \text{[Equation 6]}$$

Respective MCI values based on the motion vectors mv_small and mv_still can be expressed by the following Equations 7 and 8, respectively:

$$\text{flag inter}[mv\_small] = \text{flag\_m} \ \& \ \text{flag\_c} \ \& \ \text{flag\_b} \quad \text{[Equation 7]}$$

$$\text{flag\_inter}[mv\_still] = \text{flag\_m} \ \& \ \text{flag\_c} \ \& \ \text{flag\_b} \quad \text{[Equation 8]}$$

In this case, each of the flags "flag c" and "flag_b" may have different values for different cases, respectively.

After the completion of all the above mentioned procedures, 3 flags flag_inter[large], flag_inter[small], and flag_inter[still] are derived.

These three flags are obtained as final results of the MCI check from the side-effect check section 200, and then sent to the MCI section 100.

Based on the three flags, the MCI section 100 selects a final motion vector, and outputs a final deinterlaced result based on the final motion vector.

The procedures of selecting a final motion vector, and deriving a final deinterlaced result based on the selected final motion vector can be expressed by the following Equation 9:

$$\text{if}(\text{flag\_large}=1)mv=mv\_large;$$

$$\text{if}(\text{flag\_small}=1)mv=mv\_small;$$

$$\text{if}(\text{flag\_still}=1)mv=mv\_still;$$

$$\text{flag\_MCI} = \text{flag\_large OR flag\_small OR flag\_still} \quad \text{[Equation 9]}$$

Referring to Equation 9, it can be found that when each MCI value corresponds to "1", an associated motion vector is determined to be satisfactory. These determinations based on the MCI values have a downward sequence.

Accordingly, if two or more motion vectors are determined to be satisfactory in the side-effect check, that is, if two or more of the flags flag_large, flag_small, and flag-still have a value of "1", the motion vector associated with the lower one of the flags with a value of "1" is selected.

For example, where the large and small flags are determined to be satisfactory in the side-effect check, the motion vector associated with the small flag is selected, and the result of the deinterlacing conducted based on the selected motion vector is outputted as a final deinterlaced result.

As apparent from the above description, when at least two motion vectors are determined to be satisfactory in the side-effect check, the motion vector associated with a narrowest search range is selected from those satisfactory motion vectors.

Where an increased search range is used, the probability of detecting a block similar to the current block in terms of the shape, but irrespective of the actual motion, may be increased. To this end, the above mentioned scheme is provided in accordance with the present invention.

Although the large, small and still search ranges have been defined by "4×2" for a motion in vertical and horizontal directions, "4×0" for a motion only in a horizontal direction, and "0×0" only for no motion, the large search range may be appropriately varied in accordance with a system to which the present invention is applied. In this case, the small and still search ranges may also be appropriately varied in accordance with the varied large search range.

As apparent from the above description, the present invention provides an MCI-based deinterlacing method for video signals in which a motion vector estimation is conducted at two steps in such a fashion that a motion can be estimated by a 0.25 pixel unit. In accordance with the MCI-based deinterlacing method of the present invention, a side-effect check is carried out for the result of the motion estimation, based on diverse conditions, in order to accurately determine an applicability of the result of the motion estimation.

In accordance with the present invention, therefore, it is possible to provide an MCI algorithm implemented, in a deinterlacing for video signals of an interlaced scan format into a progressive scan format, by use of a VLSI chip capable of obtaining video signals of a progressive scan format, while minimizing a degradation in picture quality.

In accordance with the MCI-based deinterlacing method of the present invention, at least one search range is set in order to allow an estimation for at least one motion vector corresponding to the set search range. Accordingly, it is possible to provide an MCI algorithm having an increased reliability.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. A deinterlacing method for video signals based on a motion-compensated interpolation comprising:
   (a) estimating a motion vector of a video signal by a first fractional unit of a pixel and the unit of a second fractional unit of a pixel, respectively, using a previous frame of the video signal, a current field of the video signal, and a future field of the video signal;
   (b) deinterlacing the current field by interpolating empty pixels of the current field by pixels of the previous frame designated by the estimated motion vector, thereby deinterlacing the current field;
   (c) conducting a side-effect check for determining whether a result of the deinterlacing is satisfactory; and
   (d) selectively outputting the result of the deinterlacing as a deinterlaced value of the current field based upon the result of the side effect check.

2. The deinterlacing method according to claim 1, wherein the motion vector estimation step comprises the steps of:
   estimating a motion vector by the unit of a ½ pixel, using the previous frame, the current field, and the future field; and
   estimating a motion vector by the unit of a ¼ pixel, using the previous frame and the future field.

3. The deinterlacing method according to claim 2, wherein the motion vector estimation is carried out, using a basic block having a size of 4×4 applied to a frame.

4. The deinterlacing method according to claim 2, wherein the motion vector estimation is carried out, using a basic block having a size of 8×8 defined by a basic block of 4×4, applied to a frame, and pixels added to each edge of the basic block of 4×4, based on a guard region.

5. The deinterlacing method according to claim 1, wherein when the deinterlacing is conducted for empty pixels of the current field by bringing pixels of the previous frame designated by the motion vector, the motion vector estimated by the unit of a ¼ pixel is derived by conducting a weighted average for four pixels, arranged around a position of the pixel to be brought, in accordance with a bi-linear interpolation.

6. The deinterlacing method according to claim 1, wherein the side-effect check is made by conducting at least one of a check for determining whether or not the estimated motion vector has a temporal consistency, a check for determining whether or not the estimated motion vector has a critical velocity, ,and a check for determining whether or not the estimated motion vector has a backward matching accuracy.

7. The deinterlacing method according to claim 6, wherein the check with respect to a temporal consistency of the estimated motion vector comprises:
determining whether a difference between a motion vector currently derived and a motion vector previously derived is less than a predetermined critical value;
determining whether mean absolute differences respectively derived by the unit of a ½ pixel and the unit of a ¼ pixel are determined not to be considerably different from each other while being sufficiently small; and
wherein when a difference between the motion vector currently derived and the motion vector previously derived is less than the predetermined critical value, and the mean absolute differences respectively derived by the unit of a ½ pixel and the unit of a ¼ pixel are determined not to be considerably different from each other while being sufficiently small, then determining the estimated motion vector to have the temporal consistency.

8. The deinterlacing method according to claim 6, wherein the check with respect to a critical velocity of the estimated motion vector comprises:
checking a vertical component of the estimated motion vector to determine whether the estimated motion vector is within a predetermined critical velocity range; and
wherein when the estimated motion vector is within the predetermined critical velocity range, then outputting the estimated motion vector from the side-effect check step, and otherwise preventing the estimated motion vector from being outputted from the side-effect check step.

9. The deinterlacing method according to claim 6, wherein the check with respect to a backward matching accuracy comprises:
when a current block is projected onto the previous frame, based on the estimated motion vector, determining whether there is a video similar to that of the current block in a block of the previous frame onto which the current block is projected; and
wherein when there is a video similar to that of the current block in the projected block of the previous frame, then outputting the estimated motion vector from the side-effect check, and otherwise preventing the estimated motion vector from being outputted from the side-effect check.

10. The deinterlacing method according to claim 9, wherein the determination of whether or not the estimated motion vector has a backward matching accuracy is conducted using, as a reference, a largest one of respective absolute values of differences between corresponding pixels of a block of the current field and a corresponding block of the previous frame.

11. The deinterlacing method according to claim 6, wherein the result of the deinterlacing based on the currently derived motion vector is outputted when the motion vector has a temporal consistency, when the motion vector is not within a predetermined critical velocity range, and when the motion vector has a reliable backward matching accuracy.

12. A deinterlacing method for video signals based on a motion-compensated interpolation comprising:
(a) estimating a motion vector of a video signal by the unit of a ½ pixel, using a previous frame of the video signal, a current field of the video signal, and a future field of the video signal, and estimating a motion vector by the unit of a ¼ pixel based on the motion vector estimated by the unit of a ½ pixel while using the previous frame and the future field, in at least two search areas of different sizes each including a block for which the motion vector estimation is to be carried out;
(b) deinterlacing the video signal by bringing pixels of the previous frame designated by a motion vector estimated at the step (a) to the current field;
(c) conducting a side effect check for determining whether the deinterlaced video signal is reliable by checking whether the estimated motion vector has at least one of a temporal consistency, a critical velocity and a backward matching accuracy in each search area of the deinterlaced video signal; and
(d) if the result of the side-effect check is satisfactory, then outputting the result of the deinterlacing as a deinterlaced value of the current field, and if not,then outputting the result of a deinterlacing conducted in accordance with a method other than that of the step (b).

13. The deinterlacing method according to claim 12, wherein:
the deinterlacing of the video signal is carried out, based on the estimated motion vectors for each of at least two search areas of different sizes;
the reliability of the deinterlacing in association with the search areas is determined according to the result of the temporal consistency check, the critical velocity check and the backward matching accuracy check of the motion vector for each deinterlaced video signal; and
if there are at least two reliable motion vectors, a deinterlaced video signal derived based on the motion vector associated with a smaller one of the search areas is selected from the deinterlaced video signals, and outputted.

14. The deinterlacing method according to claim 13, wherein the at least two search areas comprises three search areas respectively having a size of m×n (m, n>0) in horizontal and vertical directions, a size of m×0, and a size of 0×0 within a pixel area ranging from "−Mh" to "+Mh" in a horizontal direction while ranging from "−Mv" to "+Mv" in a vertical direction, with respect to a relation between the previous frame and a future field.

15. The deinterlacing method according to claim 1, wherein the selectively outputting comprises:
if a result of the side-effect check is satisfactory, then outputting the result of the deinterlacing as a deinterlaced value of the current field; and if not, then outputting the result of a deinterlacing conducted in accordance with a method other than that of the step (b).

16. The deinterlacing method according to claim 1, wherein the first and second fractional units are less than 1.

17. The deinterlacing method according to claim 16, wherein the first fractional unit is a ½ pixel and wherein the second fractional unit is a ¼ pixel.

18. The deinterlacing method according to claim 1, wherein the side effect check determines whether the result of the deinterlacing meets prescribed characteristics.

19. The deinterlacing method according to claim 1, wherein the previous frame, the current field, and the future field correspond to sequential fields of the video signals.

20. A deinterlacing method for video signals comprising:
    (a) estimating a motion vector of a video signal by a first fractional unit of a pixel and a second fractional unit of a pixel respectively, using a previous frame of the video signal, a current field of the video signal, and a future field of the video signal in at least two search areas of different sizes each including a block for which the motion vector estimation is to be carried out;
    (b) deinterlacing the current field by interpolating empty pixels of the current field by pixels of the previous frame designated by the estimated motion vector to deinterlaced the current field;
    (c) conducting a side-effect check for determining whether a result of the deinterlacing meets prescribed characteristics in each search area of the deinterlaced video signal; and
    (d) selectively outputting the result of the deinterlacing as a deinterlaced value of the current field based upon the result of the side effect check.

21. The deinterlacing method of claim 20 wherein the side-effect check is made by conducting at least one of a check for determining whether the estimated motion vector has a temporal consistency, a check for determining whether the estimated motion vector has a critical velocity, and a check for determining whether or not the estimated motion vector has a backward matching accuracy in each search area of the deinterlaced video signal.

22. The deinterlacing method according to claim 20, wherein the first and second fractional units are less than 1.

23. The deinterlacing method according to claim 20, wherein the first fractional unit is a ½ pixel and wherein the second fractional unit is a ¼ pixel.

24. A deinterlacing method for video signals comprising:
    (a) deinterlacing a video signal using motion compensation;
    (b) conducting a side-effect check by conducting at least one of a check for determining whether an estimated motion vector has a temporal consistency, a check for determining whether the estimated motion vector has a critical velocity, and a check for determining whether the estimated motion vector has a backward matching accuracy; and
    (c) selectively outputting the result of the deinterlacing as a deinterlaced value of the current field based upon the result of the side effect check.

25. She deinterlacing method according to claim 24, wherein a motion vector of a video signal is estimated by using a first fractional unit of a pixel and a second fractional unit of a pixel respectively, using a previous frame of the video signal, a current field of the video signal, and a future field of the video signal and deinterlacing the current field is performed by interpolating empty pixels of the current field by pixels of the previous frame designated by the estimated motion vector to deinterlaced the current field.

26. The deinterlacing method according to claim 24, wherein estimating a motion vector by a unit of a ¼ pixel based on a motion vector estimated by a unit of ½ pixel using the previous frame and the future field, in at least two search areas of different sizes each including a block for which the motion vector estimation is to be carried out.

\* \* \* \* \*